United States Patent Office 3,201,051
Patented Aug. 17, 1965

3,201,051
PROCESS OF SALT MILLING A MILL POWDER
Charles W. Manger, Irvington, and Ben H. Perkins, Scotch Plains, N.J., assignors to E. I. du Pont de Nemours and Company, Wilmington, Del., a corporation of Delaware
No Drawing. Filed July 25, 1963, Ser. No. 297,654
7 Claims. (Cl. 241—22)

This invention relates to an improved method for reducing the particle size of solids. More particularly, it relates to a process for reducing crude pigments to the pigmentary state by milling with a grinding agent which can be removed by volatilization without either thermal damage to the pigment or extraction of the mill solid with a liquid.

The prior art shows various methods of reducing the particle size of solids used as pigments by milling them with salts of various kinds. For example, U.S. Patent 2,402,167 describes a method of reducing the particle size of pigments, particularly copper phthalocyanine pigments, by grinding the pigment with a suitable salt, notably, sodium chloride. The grinding is preferably carried out in a ball mill with inclusion in the milling mixture of balls, shot, bars and the like to promote grinding and prevent caking of the salt-pigment mixture. Optionally, the milling mixture may contain, in addition to the salt, a small amount of a liquid either to facilitate the milling action or to control the crystal phase of the product. Following completion of the particle size reduction step, the material used as the grinding agent is removed from the mixture by extraction with water or any other liquid in which the grinding material is soluble. The prior art also shows the use of the pigment-grinding agent mixture as an extended pigment, but this has had little application in the art since the quantity of grinding agent required (usually about 5 to 10 times the weight of the pigment) is so large that the prime pigment becomes so highly extended in the mixture as to be of limited utility. The use of a solid grinding aid which can be separated from the pigment by low temperature volatilization was not known or used prior to this invention.

In the prior art processes, the degree of subdivision obtained in the grinding operation was not realized in the final product, in general, since the very small particles obtained during the milling underwent considerable growth during the extraction operation, in which the mill powder is stirred, usually at elevated temperature, with a liquid to dissolve the milling agent. Although the pigment may be substantially insoluble in the extraction liquid, nevertheless the extremely small crystals with their very high surface energy may undergo appreciable growth in size as evidenced by electron micrographs taken before and after an extraction process. Because of this crystal growth, the product obtained after extraction does not have the color strength of the pigment in the mill powder before extraction. Various methods have been used to avoid this difficulty, such as extraction at reduced temperatures and the like; but these have not been wholly effective.

Formation of difficultly dispersible aggregates of pigment particles occurs in the use of prior art methods in the steps of the extraction and drying of the pigment from an aqueous presscake following milling. Such aggregates impair pigment strength and adversely affect decorative and protective properties of systems containing them.

An object of this invention is an improved process for reduction of the particle size of solids in the pigmentary size range. Another object is an improved salt-milling process for pigments. A further object is a process for salt-milling pigments which yields the product, following removal of the salt, in substantially the same particle size as is obtained during milling. A still further object is a process for salt-milling pigments using as the milling agent a solid material which can be removed by volatilization directly from the solid to the gaseous state at temperatures which do not cause thermal damage to the pigment. Other objects will be apparent from the description of the invention given hereinafter.

The objects of the invention are accomplished, according to the present invention, by a salt-milling process wherein the grinding agent used in the milling is a solid at the grinding temperature but can be vaporized directly from the milled mixture by gentle heating.

If desired, minor amounts of various additives may be included in the milling mixture to direct crystal phase, aid in grinding, hinder caking of the mill powder, modify pigment dispersibility, or act as a pigment extender.

For a clearer understanding of the invention, the following specific examples are given. These examples are intended to be merely illustrative of the invention and not in limitation thereof. Unless otherwise specified, all parts are by weight.

Example I

A quart cylindrical steel can was charged with:

15 grams crude quinacridone prepared as described in U.S. Patent 2,821,529 by oxidation of dihydroquinacridone and thoroughly extracting to remove impurities,
135 grams ammonium carbonate,
1500 grams steel balls approximately ½ inch in diameter,
150 grams galvanized roofing nails approximately 1¼ inches in length with ½ inch heads.

The can was sealed and then rotated at room temperature to effect milling. The speed of rotation was approximately 65% of the critical speed, the critical speed being defined as that speed where the steel balls are held to the inner surface of the mill by centrifugal effects. After milling for approximately 72 hours, the powder was separated from the steel shot and nails by screening through a suitable sieve. The milling agent was then removed from the ammonium carbonate-pigment mixture by heating the mixture to approximately 70° C. to decompose the ammonium carbonate to gaseous products. The pigment obtained in this way was characterized by exceptionally small particle size, a low degree of crystallinity, as indicated by a diffuse X-ray diffraction pattern, and a soft, fluffy appearance. The product dispersed exceptionally well in vehicles of the type conventionally used in coating compositions.

For comparison, a conventional type salt-milling was carried out with another portion of the same crude quinacridone. A quart cylindrical can was charged with:

15 grams crude quinacridone,
135 grams dry sodium chloride,
1500 grams steel balls approximately ½ inch in diameter,
150 grams galvanized roofing nails approximately 1¼ inches in length with ½ inch heads.

The can was sealed and the charge was milled for approximately 72 hours by rotating the can in conventional fashion. The mill was then discharged and the mill powder was separated from the steel shot and nails by screening. The screened powder was slurried in 4 liters of 4% $H_2SO_4$ solution. The slurry was then heated to the boil to dissolve the salt and any metal particles from the grinding medium and then filtered. The filter cake was washed with hot water to remove soluble salts and then dried at approximately 70° C. Examination of a portion of the dry mill powder before the extraction showed the pigment to consist of very small particles, but the particle size was considerably enlarged upon stirring in the hot extraction slurry. Further, the final product, obtained by drying the extracted presscake, contained an appreciable proportion of relatively large hard pigment aggregates which were not readily dispersed to full potential pigment strength in coating composition vehicles by conventional procedures. In contrast, the pigment milled with ammonium carbonate, as described in the first part of this example, was substantially free of such pigment aggregates.

*Example II*

15 parts of crude copper phthalocyanine, 135 parts ammonium bicarbonate, 1500 parts steel balls and 150 parts of roofing nails were charged to a cylindrical ball mill of such capacity that the mill charge occupied approximately 50% of the mill volume. The mill was then rotated in conventional fashion for salt-milling for approximately 18 hours, and was then discharged through a sieve, to separate the shot and nails from the powder. The ammonium bicarbonate was then removed from the mill powder by heating the powder to approximately 60° C. The copper phthalocyanine product obtained had substantially the same particle size following removal of the ammonium bicarbonate as was present in the mixture immediately upon completion of milling. The product was a flurry, soft powder which dispersed readily in vehicles to yield pigmented coating compositions.

*Example III*

Example II was repeated but with replacement of the ammonium bicarbonate of Example II by an equal weight of ammonium formate and heating at 80° C. The results were substantially the same as those of Example II.

*Example IV*

A steel ball mill of 1 quart capacity was charged with 15 grams of crude quinacridone, 5 grams of barium sulfate (blanc fixe) powder, 135 grams ammonium bicarbonate, 1500 grams steel balls approximately ½ inch in diameter, and 150 grams of roofing nails. The mill was rotated for approximately 24 hours to effect milling and the charge was then discharged from the mill through a ¼ inch sieve. The sieved powder was then heated to approximately 70° C. and maintained at that temperature until no further weight loss was observed. The red pigmentary product obtained was a quinacridone lake on barium sulfate which contained approximately 75% quinacridone and 25% barium sulfate. The product was characterized by small pigment particle size, a low degree of crystallinity and excellent dispersibility in coating composition vehicles, plastics and the like.

*Example V*

15 parts of crude copper phthalocyanine, 135 parts of ammonium bicarbonate, 5 parts of tetrachloroethylene, 1500 parts of ½ inch steel balls and 150 parts of roofing nails were added to a ball mill of such size that the mill charge occupied about 50% of the mill volume. The mixture was ground in conventional fashion for about 20 hours and was then discharged through a sieve. The ammonium bicarbonate and tetrachloroethylene were removed by gentle heating. The product obtained was a small particle size green shade beta phase copper phthalocyanine pigment, whereas in the absence of the added tetrachloroethylene, a red shade alpha phase product was obtained.

The improved process of this invention is applicable generally to colored pigments. A wide variety of other pigments may be used in place of the quinacridone and copper phthalocyanine of the above examples. For example, chlorinated copper phthalocyanine, vat dye pigments (e.g., dibromoanthanthrone, Colour Index No. 59300 and C.I. Vat Yellow 3, Colour Index 61725) and the like may be used with resultant advantages similar to those obtained in the above examples.

The preparation of lakes is advantageous particularly in the case of expensive pigments and is widely used in the art. The above examples showed the use of barium sulfate as the extender. Other extenders, such as calcium carbonate, alumina hydrate, titanium dioxide, zinc oxide and the like, conventionally used as extenders for pigment lakes, can be used in the foregoing process in place of the barium sulfate.

Difficulty is occasionally encountered in salt-milling as the result of caking of the mill charge in which the entire charge becomes one coherent mass with consequent termination of grinding action. Steel balls and the roofing nails added to the mill charge hinder such caking but further preventatives may be desirable in special cases. The use of a small quantity of an extender such as blanc fixe, calcium carbonate, titanium dioxide and the like tends to inhibit caking and facilitate milling; and the use of such agents is permissible where the presence of such a minor amount of an extender is not objectionable in the final product.

Since the invention can be regarded as an improvement in the process of the subdivision of pigments by salt-milling, the variables relating to salt-milling are also applicable here. It is necessary, of course, to maintain temperature below the temperature of decomposition of the grinding medium or below the temperature at which the vapor pressure of the grinding medium becomes appreciable. Mill charge, ratio of grinding medium to pigment, mill occupancy, quantity and size of steel balls, the use of roofing nails or other devices, can all be varied in accordance with recognized limits known in the art. Similarly, speed of rotation of the mill, size and the shape of the mill and the use of special types of ball mills such as vibration type ball mills and the like are well known in the art and can be applied in the present invention in accordance with established procedures.

The critical requirements for the grinding medium are that it be stable under the conditions of the ball mill yet be converted to volatile products on mild heating. Ammonium bicarbonate is the preferred milling material, but other materials meeting the above-mentioned requirements are also applicable. Ammonium carbonate and ammonium formate have also been found to meet these requirements. Also liquid additives may be mixed with the grinding agent as phase controllers and directors, caking inhibitors or modifiers for the pigment surface.

The procedure used in preparing the crude pigment used in the process of this invention is not critical; however, it is essential that any harmful impurities be removed prior to milling, since the pigment is not extracted subsequent to milling. The extraction procedures conventionally used in the art in the preparation of crude pigment for particle size reduction ordinarily suffice but in special instances more drastic extraction procedures may be required. Such are well within the skill and knowledge of those versed in the art.

The invention permits the preparation of pigments in the form of very small particles. It also permits retention in the final pigment of the extremely small size developed during the milling, in contrast to conventional salt-milling procedures in which such size is not retained because of the necessity for the removal of the grinding agent from the milled pigment by extraction which produces particle growth. The product obtained by the process of this invention is a soft, readily dispersible powder. The surface of the pigment can be modified during milling and the modified surface retained, in contrast to conventional procedure wherein the surface is altered further by the extraction procedure.

The pigment processed according to this invention is not subjected to drying from a liquid following particle size reduction as is done in prior art methods. Thus, a major contributor to formation of the hard, difficultly dispersible, pigment aggregates ordinarily found in prior art products is avoided, as is the increase in particle size with the loss of inherent pigment strength due to the drying operation.

Since it is obvious that many changes and modifications can be made in the above-described details without departing from the nature and spirit of the invention, it is to be understood that the invention is not to be limited to said details except as set forth in the appended claims.

The invention claimed is:

1. In the process of salt-milling a mill powder consisting of crude pigments to pigmentary particle size, the improvement which comprises milling said mill powder in the presence of a solid salt grinding agent which is thermally stable under the conditions of said salt-milling and is volatilizable when heated to temperatures below that at which said pigmentary particles decompose and thereafter heating the mill powder-solid salt grinding agent mixture to a temperature sufficient to volatilize said solid salt grinding agent.

2. In the process of salt-milling a mill powder consisting of crude pigments to pigmentary particle size, the improvement which comprises milling said mill powder in the presence of a solid salt grinding agent which is a member selected from the group consisting of ammonium carbonate, ammonium bicarbonate and ammonium formate which is thermally stable under the conditions of said salt-milling and is volatilizable when heated to temperatures below that at which said pigmentary particles decompose and thereafter heating the mill powder-solid salt grinding agent mixture to a temperature sufficient to volatilize said solid salt grinding agent.

3. In the process of salt-milling at substantially room temperature a mill powder consisting of crude pigments to pigmentary particle size, the improvement which comprises milling said mill powder in the presence of ammonium carbonate as the grinding agent and thereafter heating the mill powder-ammonium carbonate mixture to about 60° C. whereby the ammonium carbonate decomposes into gaseous products.

4. In the process of salt-milling at substantially room temperature a mill powder consisting of crude pigments to pigmentary particle size, the improvement which comprises milling said mill powder in the presence of ammonium bicarbonate as the grinding agent and thereafter heating the mill powder-ammonium bicarbonate mixture to about 60° C. whereby the ammonium bicarbonate decomposes into gaseous products.

5. In the process of salt-milling at substantially room temperature a mill powder consisting of crude pigments to pigmentary particle size, the improvement which comprises milling said mill powder in the presence of ammonium formate as the grinding agent and thereafter heating the mill powder-ammonium formate mixture to about 80° C. whereby the ammonium formate decomposes into gaseous products.

6. In the process of salt-milling a mill powder consisting of crude copper phthalocyanine pigments to pigmentary particle size, the improvement which comprises milling said mill powder in the presence of a solid salt grinding agent which is thermally stable under the conditions of said salt-milling and is volatilizable when heated to temperatures below that at which said pigmentary particles decompose and thereafter heating the mill powder-solid salt grinding agent mixture to a temperature sufficient to volatilize said solid grinding agent.

7. In the process of salt-milling a mill powder consisting of crude quinacridone pigments to pigmentary particle size, the improvement which comprises milling said mill powder in the presence of a solid salt grinding agent which is thermally stable under the conditions of said salt-milling and is volatilizable when heated to temperatures below that at which said pigmentary particles decompose and thereafter heating the mill powder-solid salt grinding agent mixture to a temperature sufficient to volatilize said solid salt grinding agent.

References Cited by the Examiner

UNITED STATES PATENTS

| | | | |
|---|---|---|---|
| 2,378,283 | 6/45 | Bucher | 241—22 X |
| 2,402,167 | 6/46 | Lang | 241—22 X |
| 3,016,384 | 1/62 | Caliezi | 260—314.5 |
| 3,074,958 | 1/63 | Fleysher et al. | 260—314.5 |
| 3,127,412 | 3/64 | Gaertner | 260—314.5 |

J. SPENCER OVERHOLSER, *Primary Examiner.*

WILLIAM W. DYER, JR., *Examiner.*